Feb. 15, 1949.  H. C. FRENCH  2,461,596
STEERING MECHANISM FOR TWO-WHEELED
TRACTORS OR THE LIKE
Filed Nov. 18, 1946  3 Sheets-Sheet 1

INVENTOR.
Henry C. French
BY
Morsell & Morsell
ATTORNEYS.

Feb. 15, 1949.                H. C. FRENCH                 2,461,596
                    STEERING MECHANISM FOR TWO-WHEELED
Filed Nov. 18, 1946         TRACTORS OR THE LIKE           3 Sheets-Sheet 3

INVENTOR.
Henry C. French
BY
Morsell & Morsell
ATTORNEYS

Patented Feb. 15, 1949

2,461,596

UNITED STATES PATENT OFFICE 2,461,596

STEERING MECHANISM FOR TWO-WHEELED TRACTORS OR THE LIKE

Henry C. French, Elm Grove, Wis., assignor to The Heil Co., Milwaukee, Wis., a corporation of Wisconsin Application November 18, 1946, Serial No. 710,636

11 Claims. (Cl. 180—79.4)

1

This invention relates to improvements in steering mechanism for two-wheeled tractors or the like.

When two-wheeled tractors are employed for the purpose of pulling two-wheeled trailer units, such as scrapers, dump wagons or the like, the rear vehicle has a fifth wheel connection with the tractor and steering must be accomplished by causing a relative turning movement of the tractor with the fifth wheel serving as a pivot point. Heretofore considerable difficulty has been encountered in providing a simple, quick-acting, and sensitive steering method which will be effective under all of the varying conditions encountered in use.

It is a general object of the present invention to provide improved steering mechanism of the class described wherein the steering speed is always in direct proportion to the traveling speed of the vehicle.

A more specific object of the invention is to provide power-operated steering mechanism as above described, wherein, during normal operation, when the tractor engine is running at higher speed than the speed of the vehicle, power for steering is derived from the engine, and wherein, when the engine is dead or when the vehicle is traveling at a higher speed than the engine, power for steering is derived from the rear wheels of the tractor.

A further object of the invention is to provide a construction as above described wherein there is an intermediate element supporting a first fifth wheel pivot member on the tractor in a manner to provide for rocking movement on a horizontal axis extending longitudinally on the tractor, and wherein there is novel means for transmitting power for steering from the tractor to transmission means on said rockable member.

A further object of the invention is to provide steering mechanism for two-wheeled tractors or the like wherein there is a positive lock so that there is no slippage and no undesired steering action when the steering controls are not being manipulated.

A still further object of the invention is to provide a construction as above described wherein the vertical axis of the fifth wheel pivot is so disposed and constructed as to cause the tractor to tend to return to a straight line position, after steering, as soon as the steering controls are released. Thus, wandering of the vehicle is prevented.

With the above and other objects in view, the

2 invention consists in the improvements in steering mechanism for two-wheeled tractors or the like, and all its parts and combinations, as set forth in the claims, and all equivalents thereof.

In the accompanying drawings, illustrating one complete embodiment of the preferred form of the invention, in which the same reference numerals designate the same parts in all of the views.

Figure 4:
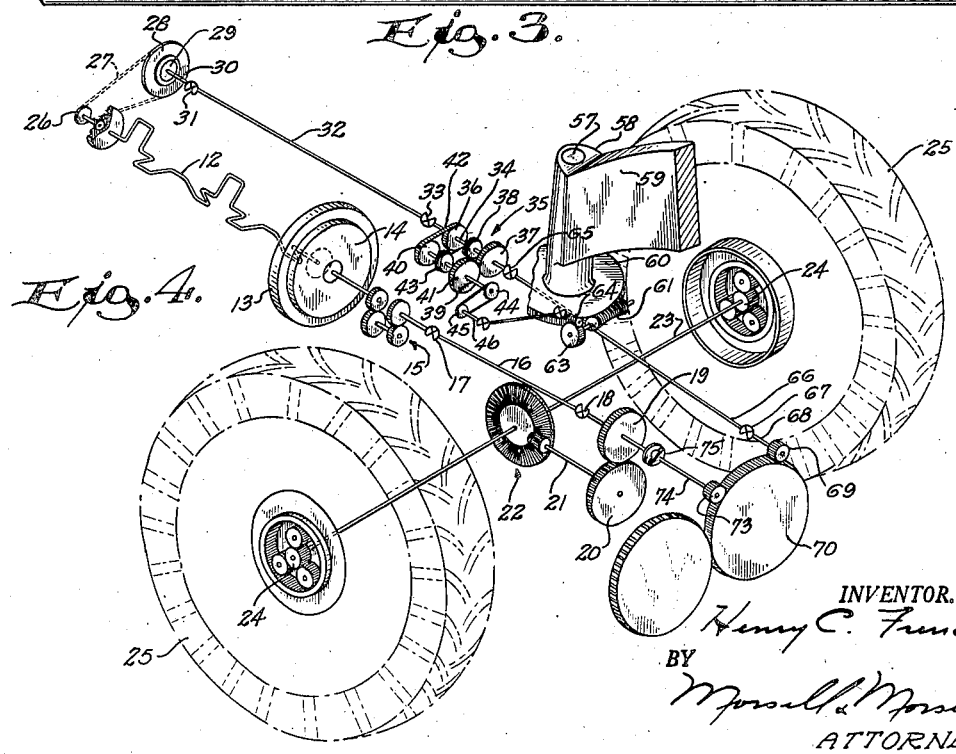
Fig. 4 is a schematic view in perspective illustrating the power flow to the steering mechanism and vehicle wheels.

Referring more particularly to the drawing, the numeral 10 designates a tractor having an internal combustion engine 11 provided with a crank shaft 12 (see Fig. 4), the crank shaft being equipped with the usual fly wheel 13. Through the medium of a suitable clutch 14 and transmission 15, motion is transmitted to a main drive shaft 16, there being universal joints 17 and 18. Driven by the main drive shaft is a gear 19 which meshes with a gear 20 rigidly mounted on a shaft 21. Through suitable differential gearing 22 motion is transmitted to the rear axle 23 and through suitable gear reduction sets 24, motion is transmitted to the tractor wheels 25.

On the front of the crank shaft is a sprocket wheel 26 which is connected by an endless chain 27 with a larger sprocket wheel 28. The latter is mounted rigidly on a hub 29 forming an over-running clutch which normally causes the sprocket wheel to drive a shaft 30. The shaft 30 is connected by a universal joint 31 with a shaft section 32, and the latter is connected by a universal joint 33 with a shaft 34 of a reversing box 35. Mounted on the shaft 34 within the reversing box is a sprocket wheel 36 and a gear 37. Between the sprocket wheel 36 and gear 37 is a clutch 38.

Figure 1:
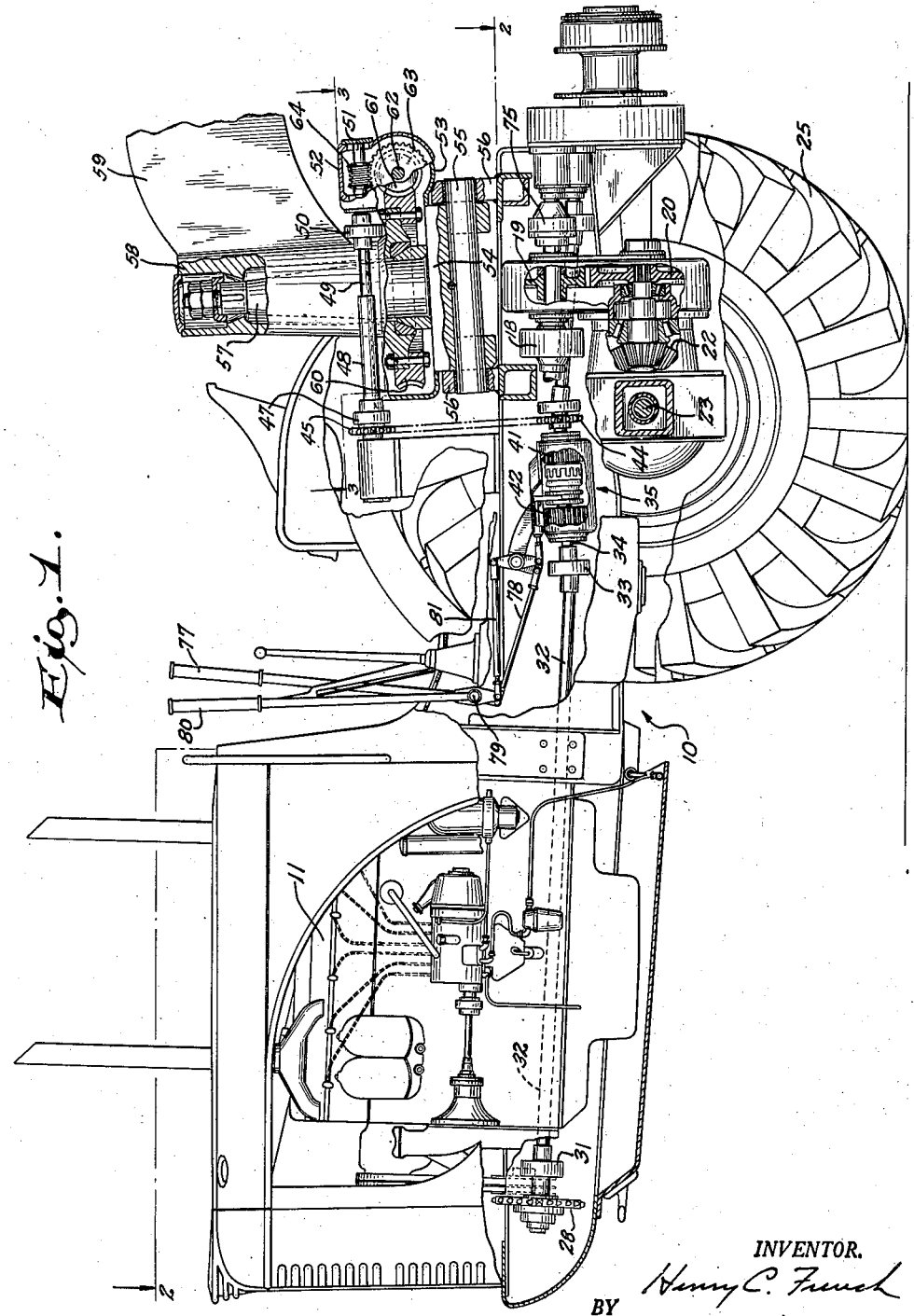
Fig. 1 is a view of the tractor, generally in side elevation, with parts broken away and shown in longitudinal vertical section, a portion of the neck of the trailer vehicle being illustrated at the fifth wheel in assembled relationship with the tractor.
Figure 3:
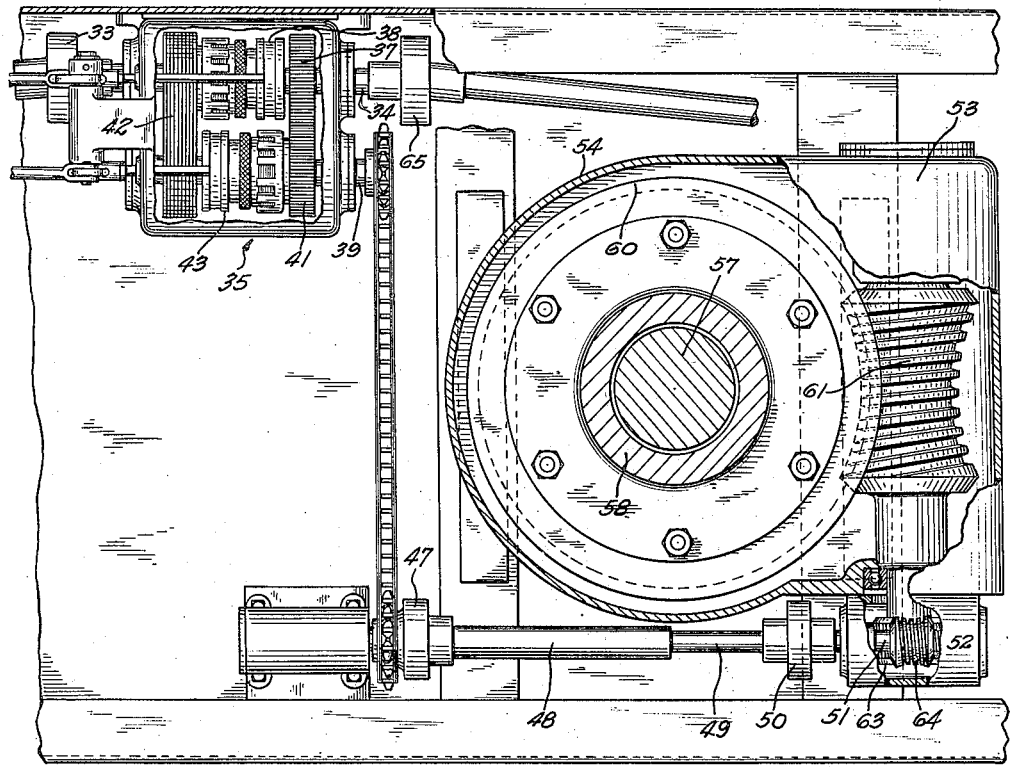
Fig. 3 is a fragmentary plan view showing the fifth wheel and driving connections therefor, parts being broken away and shown in horizontal section.

Extending parallel to the shaft 34 within the reversing box 35 is another shaft 39 carrying a sprocket wheel 40 and a gear 41. The sprocket wheels 36 and 40 are connected by an endless chain 42 and the gears 37 and 41 are in mesh. Between the sprocket wheel 40 and the gear 41 is a clutch 43. The rear end of the shaft 39 carries a rigidly mounted sprocket wheel 44 which is connected by an endless chain with a sprocket wheel 45 mounted on a shaft 46. The latter is connected by a universal joint 47 with an internally splined tubular shaft 48. An externally splined shaft 49 fits within the tubular shaft 48 for relative sliding movement. The shaft 49 is connected by a universal joint 50 with a shaft 51 journalled in a housing 52 (see Figs. 1 and 3), projecting upwardly from a main housing 53 carried by an intermediate element 54.

The intermediate element has a shaft 55 associated with the lower portion thereof and provided with projecting ends which are journalled in ears 56 extending upwardly from the frame of the tractor. The shaft 55 is so disposed that its axis is at an acute angle with the horizontal while extending generally longitudinally of the tractor.

Projecting upwardly from the intermediate element 54 is a king pin or first fifth wheel pivot member 57. A second fifth wheel pivot member 58 which is circular in cross-section is rigidly connected to the forward end of a neck 59 projecting from the trailer vehicle. The connection between the fifth wheel pivot members 57 and 58 is such as to provide for relative rotation, and it is to be noted that the axis of rotation departs from the perpendicular and is inclined slightly forwardly in the vertical plane of the longitudinal center line of the trailer for a purpose to be hereinafter described.

Bolted to the lower periphery of the second fifth wheel pivot member 58 is a worm wheel 60 which meshes with a worm 61 rigidly mounted on a shaft 62. The latter shaft is journalled transversely of the housing 53 on the intermediate element. Mounted rigidly on the shaft 62 near one of its ends is a worm wheel 63 which engages a worm 64 mounted on the shaft 51.

Figure 2:
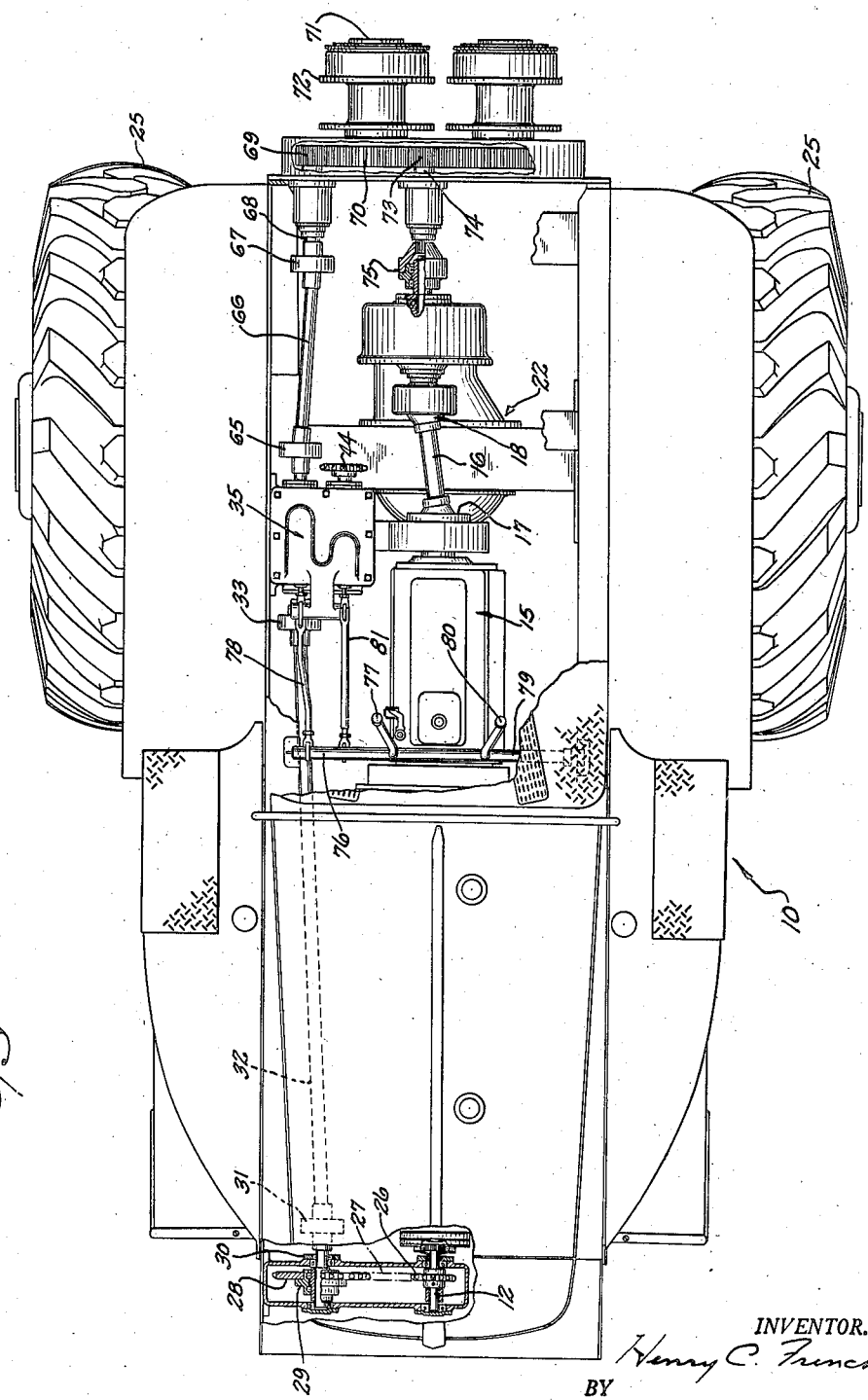
Fig. 2 is a top view of the tractor, parts of the body being broken away.

The shaft 34 in the reversing box 35 has a rear end connected by a universal joint 65 with a rearwardly extending shaft 66. The latter is connected by universal joint 67 with a shaft section 68. Rigidly connected to the shaft 68 is a gear 69 which meshes with a large gear 70 (see Figs. 2 and 4). The gear 70 is mounted on an idler shaft 71, and the latter may carry a winch 72, if desired. The gear 70 is also in mesh with a gear 73 mounted on the rear end of a shaft 74. The shaft 74 is connected by an overrunning clutch 75 with the extension of the main drive shaft 16 on which the main gear 19 is mounted.

Extending transversely of the tractor and located in front of the operator's seat is a rock shaft 76 (see Fig. 2) which is adapted to be rocked by a hand lever 77. The rock shaft 76 is connected by linkage 78 with the clutch 38 inside of the reversing box. Extending axially of the rock shaft 76, preferably on the opposite side of the vehicle, is a rock shaft 79 operated by a hand lever 80. The rock shaft 79 is connected by a linkage 81 with the other clutch 43 within the reversing box.

*Operation*

During normal operation of the tractor, when the engine 10 is running at higher speed than the speed of the tractor, power for steering is furnished through transmission of motion from the crank shaft 12 through the sprocket shaft 27 to the shaft 32. If it is desired to steer in one direction, the hand lever 77 is manipulated. This will act through the rock shaft 76 and linkage 78 to cause engagement of the clutch 38 within the reversing box 35. Inasmuch as the clutch 43 is out of engagement, power from the shaft 32 will be transmitted through the gears 37 and 41, through the sprocket wheels 44 and 45, to the shafts 46 and 48. Inasmuch as the tubular shaft 48 has a splined connection with the shaft 49, the worm 64 will be driven. This will act through the worm wheel 63, shaft 62, worm 61, and worm wheel 60, to cause a relative turning movement between the fifth wheel members 57 and 58. This will result in steering of the vehicle in one direction. To steer in the opposite direction, the hand lever 77 is manipulated to cause a disengagement of the clutch 38, and the hand lever 80 is operated to cause an engagement of the clutch 43. Power from the shaft 32 will then be transmitted by the sprocket chain 42 to the sprocket wheel 40, and shaft 39. This will cause a rotation of the shaft 39 in a reverse direction from its direction of rotation when driven by the gear 37. A relative rotation will then take place between the members 57 and 58 in the same manner as heretofore described, but in a reverse direction to accomplish steering in such reverse direction.

During movement of the vehicle over rough or uneven ground, the rockable mounting of the intermediate element 54 on the axis of the shaft 55 permits one vehicle to tilt laterally without affecting the other vehicle. Such rocking movement is permitted by the splined connection between the shafts 48 and 49 and by the universal joints 47 and 50.

During certain types of operation, when the vehicle is travelling down hill, the speed of the vehicle may be greater than the engine speed. When such is the case, it is very undesirable to have a slow steering action proportionate only to the speed of the engine. It is also exceedingly dangerous, if the engine should stall while the vehicle is travelling at a relatively high rate down an incline, to have steering action suddenly interrupted. The present invention takes care of these important contingencies. Whenever the engine is dead, or whenever the travelling speed of the vehicle is greater than the engine speed, then the overrunning clutch 29 will automatically disconnect the shaft 32 from its drive through the sprocket chain 27. At the same time the overrunning clutch 75 will act to cause the shaft 74 to be driven by the wheels through the shaft 21 and gears 20 and 19. The rotating shaft 74 will transmit its motion through the gears 73, 70, and 69, to the shaft 66. The latter will drive the shaft within the reversing box 35 and permit steering in the same manner as heretofore described with power, however, being furnished from the rear wheels of the moving vehicle.

After steering in one direction or the other has been effected and immediately after the hands are released from the steering controls, the arrangement is such, due to a novel feature of this invention, that the tractor tends to return to a straight line direction. This is accomplished in combination with the rockable mounting on the axis of the shaft 55 by having the king pin 57 inclined forwardly somewhat with approximately a 3° incline from the perpendicular as is clear from Fig. 1. This causes the tractor frame in the front to rise slightly away from the normal horizontal plane when it is being steered from the right to the left or vice versa. As a result, gravity will urge it to swing back toward the center position as soon as the steering controls are released.

It is apparent from the above that the steering mechanism above described normally makes use of the power furnished by the vehicle engine to accomplish steering, but insures steering action during certain operating conditions when the speed of the vehicle is greater than the speed of the engine. It is also apparent that the direction of steering is controlled in a simple manner and that power is transmitted to the fifth wheel without in any way interfering with the relative rocking motion of the intermediate element.

Various changes and modifications may be made without departing from the spirit of the invention, and all such changes are contemplated, as may come within the scope of the claims.

What I claim is:

1. In combination, a wheeled pulling vehicle having an engine, a trailer vehicle, a first fifth wheel pivot member on the pulling vehicle, a cooperating fifth wheel pivot member rotatable with respect to said first fifth wheel pivot member and connected to the trailer vehicle, a power takeoff from said engine, steering mechanism normally driven by said power takeoff from the engine for causing relative rotation in a selected direction between said two fifth wheel pivot members, a power takeoff from the wheels of the pulling vehicle, and means for automatically causing said steering mechanism to be driven by the power takeoff from the wheels whenever the speed of the vehicle exceeds the speed of the engine.

2. In combination, a wheeled pulling vehicle having an engine, a trailer vehicle, a first fifth wheel pivot member on the pulling vehicle, a cooperating fifth wheel pivot member rotatable with respect to said first fifth wheel pivot member and connected to the trailer vehicle, a power take off from said engine, a power takeoff from the wheels of the pulling vehicle, steering mechanism at the fifth wheel for causing relative rotation in a selected direction between said two fifth wheel pivot members, means connecting said steering mechanism to the power takeoff from the engine when the speed of the engine exceeds the speed of the vehicle, and means connecting said steering mechanism to the power takeoff from the vehicle wheels when the speed of the vehicle overtakes the speed of the engine.

3. In combination, a wheeled pulling vehicle having an engine, a trailer vehicle, a first fifth wheel pivot member on the pulling vehicle, a cooperating fifth wheel pivot member rotatable with respect to said first fifth wheel pivot member and connected to the trailer vehicle, a power takeoff from said engine, a power takeoff from the wheels of the pulling vehicle, steering mechanism at the fifth wheel for causing relative rotation in a selected direction between said two fifth wheel pivot members, means including an overrunning clutch connecting said steering mechanism to the power takeoff from the engine when the speed of the engine exceeds the speed of the vehicle, and means including an overrunning clutch connecting said steering mechanism to the power takeoff from the vehicle wheels when the speed of the vehicle overtakes the speed of the engine.

4. In combination, a wheeled pulling vehicle having an engine, a trailer vehicle, an intermediate element including a first fifth wheel pivot member mounted on the pulling vehicle for rocking movement on an axis which extends longitudinally of said pulling vehicle, a cooperating fifth wheel pivot member rotatable with respect to first fifth wheel pivot member and connected to the trailer vehicle, a power takeoff from said engine, steering mechanism at the fifth wheel for causing relative rotation between said two fifth wheel pivot members, and means including an elongated transmission member at one side of said axis for rocking movement and extending generally longitudinally of the vehicle and having a universal joint at each end for transmitting power from said power takeoff to said steering mechanism, said transmission member having a portion formed of splined telescopic sections.

5. In combination, a two-wheeled pulling vehicle, a trailer vehicle, an intermediate element including a first fifth wheel pivot member mounted on the pulling vehicle for rocking movement on an axis which extends longitudinally of said pulling vehicle, a cooperating fifth wheel pivot member rotatable with respect to said first fifth wheel pivot member and connected to the trailer vehicle, said pivot members being so disposed on their respective vehicles that the axis of rotation between them is inclined forwardly away from the perpendicular, and means for causing relative rotation in a selected direction between said two fifth wheel pivot members to cause steering movement of the vehicles.

6. In combination, a wheeled pulling vehicle, a trailer vehicle, an intermediate element including a first fifth wheel pivot member mounted on the pulling vehicle for rocking movement on an axis which extends longitudinally of said pulling vehicle, a cooperating fifth wheel pivot member rotatable with respect to said first fifth wheel pivot member and connected to the trailer vehicle, a worm wheel surrounding said last mentioned pivot member and connected thereto, a worm supported for rotation on the intermediate element and engaging said wormwheel, a wormwheel rigidly connected to and positioned axially of said worm for rotation therewith, a second worm rotatably mounted on the intermediate element and in mesh with said second mentioned wormwheel, and means for transmitting power from the vehicle to said last mentioned worm, said means being constructed so as to permit rocking movement of the intermediate element.

7. In combination, a wheeled pulling vehicle having an engine, a trailer vehicle, a first fifth wheel pivot member on the pulling vehicle, a cooperating fifth wheel pivot member rotatable with respect to said first fifth wheel pivot member and connected to the trailer vehicle, a first shaft on the pulling vehicle, means including an overrunning clutch for connecting one end of said first shaft to the pulling vehicle engine so that the shaft is driven by said engine when the clutch is in engagement, means including an overrunning clutch for connecting the other end of said shaft to the pulling vehicle wheels when said last clutch is in engagement and when the first clutch is out of engagement, a second shaft parallel to a part of said first shaft, means for transmitting motion from said second shaft to said fifth wheel pivot members to cause relative rotation between said two fifth wheel pivot members and steering of the vehicle, and means for transmitting rotation in a selected direction from said first shaft to said second shaft.

8. In combination, a wheeled pulling vehicle having an engine, a trailer vehicle, an intermediate element including a first fifth wheel pivot member mounted on the pulling vehicle for rocking movement on an axis which extends longitudinally of said pulling vehicle, a cooperating fifth wheel pivot member rotatable with respect to first fifth wheel pivot member and connected to the trailer vehicle, a power takeoff from said engine, steering mechanism at the fifth wheel for causing relative rotation between said two fifth wheel pivot members, and means including a shaft located at one side of said axis for rocking movement for transmitting power from said power take-off to said steering mechanism, said shaft including telescopic sections and flexible joints and being so constructed as not to interfere with the rockability of said intermediate element.

9. In combination, a wheeled pulling vehicle having an engine, a trailer vehicle, an intermediate element including a first fifth wheel pivot member mounted on the pulling vehicle for rocking movement on an axis which extends longitudinally of said pulling vehicle, a cooperating fifth wheel pivot member rotatable with respect to first fifth wheel pivot member and connected to the trailer vehicle, a power take-off from said engine, steering mechanism at the fifth wheel for causing relative rotation between said two fifth wheel pivot members, and means including an elongated transmission member located at one side of said axis for rocking movement and generally longitudinally of the vehicle and having a universal joint at each end for transmitting power from said power take-off to said steering mechanism, said transmission member having a portion formed of splined telescopic sections.

10. In combination, a two-wheeled pulling vehicle, a trailer vehicle, an intermediate element including a first fifth wheel pivot member mounted on the pulling vehicle for rocking movement on an axis which extends longitudinally of said pulling vehicle, a cooperating fifth wheel pivot member rotatable with respect to said first fifth wheel pivot member and connected to the trailer vehicle, said pivot members being so disposed on their respective vehicles that the axis of rotation between them is inclined forwardly away from the perpendicular and in the vertical plane of the center line of the trailer vehicle, and means for causing relative rotation in a selected direction between said two fifth wheel pivot members to cause steering movement of the vehicles.

11. In combination, a two-wheeled pulling vehicle, a trailer vehicle, an intermediate element including a first fifth wheel pivot member mounted on the pulling vehicle for rocking movement on an axis which extends longitudinally of said pulling vehicle and at a slight incline downwardly toward the front of the vehicle, a cooperating fifth wheel pivot member rotatable with respect to said first fifth wheel pivot member and connected to the trailer vehicle, the last mentioned pivot member being so disposed and the before mentioned inclination of the axis for rocking movement causing the first mentioned pivot member to be so disposed that the axis of rotation between the two pivot members is inclined forwardly away from the perpendicular, and said pivot members being approximately in the vertical plane of the center line of the trailer vehicle, and means for causing relative rotation in a selected direction between said two fifth wheel pivot members to cause steering movement of the vehicle.

HENRY C. FRENCH.

REFERENCES CITED

The following references are of record in the file of this patent:

UNITED STATES PATENTS

| Number | Name | Date |
|---|---|---|
| 1,405,435 | Post | Feb. 7, 1922 |
| 1,868,082 | Swartz | July 19, 1932 |
| 1,873,447 | McCray | Aug. 23, 1932 |
| 2,349,196 | Perkins | May 16, 1944 |
| 2,408,359 | Akers | Oct. 1, 1946 |
| 2,425,631 | McIntosh | Aug. 12, 1947 |